United States Patent [19]

Estepp et al.

[11] Patent Number: 5,168,562
[45] Date of Patent: Dec. 1, 1992

[54] METHOD AND APPARATUS FOR DETERMINING THE ALLOWABLE DATA PATH WIDTH OF A DEVICE IN A COMPUTER SYSTEM TO AVOID INTERFERENCE WITH OTHER DEVICES

[75] Inventors: Craig A. Estepp, Houston; David M. Burckhartt, Spring, both of Tex.

[73] Assignee: Compaq Computer Corporation, Houston, Tex.

[21] Appl. No.: 313,236

[22] Filed: Feb. 21, 1989

[51] Int. Cl.⁵ .................... G06F 13/40; G06F 13/00
[52] U.S. Cl. .............................. 395/500; 364/DIG. 2; 364/240; 364/240.3; 364/232.8; 364/927.92; 364/931; 364/931.1; 364/935.47; 395/325
[58] Field of Search ... 364/200 MS File, 900 MS File; 395/325, 375

[56] References Cited

U.S. PATENT DOCUMENTS

| | | | |
|---|---|---|---|
| 4,213,177 | 7/1980 | Schmidt | 395/500 |
| 4,286,321 | 8/1981 | Baker et al. | 395/325 |
| 4,447,878 | 5/1984 | Kinnie et al. | 395/325 |
| 4,633,437 | 12/1986 | Mothersole et al. | 395/250 |
| 4,679,166 | 7/1987 | Berger et al. | 395/650 |
| 4,683,534 | 12/1987 | Tietjen et al. | 395/325 |
| 4,716,527 | 12/1987 | Graciotti | 395/500 |
| 4,736,317 | 4/1988 | Hu et al. | 395/325 |
| 4,766,538 | 8/1988 | Miyoshi | 395/325 |
| 4,831,514 | 5/1989 | Turlakov et al. | 395/500 |
| 4,845,611 | 7/1989 | Turlakov et al. | 395/250 |
| 4,876,639 | 10/1989 | Mensch, Jr. | 395/500 |
| 4,893,235 | 1/1990 | Butts, Jr. et al. | 395/375 |
| 4,965,723 | 10/1990 | Kirk et al. | 395/325 |

OTHER PUBLICATIONS

IBM Corp., RT PC Hardware Technical Reference, vol. 1, Second Edition, Sep. 1986, pp. 6-4 to 6-28.
IBM Corp., Personal Computer AT Technical Ref., First Edition, Sep. 1985, pp. 1-24 to 1-38.

Primary Examiner—Thomas C. Lee
Assistant Examiner—Krisna Lim
Attorney, Agent, or Firm—Pravel, Gambrell, Hewitt, Kimball & Krieger

[57] ABSTRACT

A circuit board is capable of indicating whether it is located in an 8 bit slot and is capable of operating on an 8 bit or 16 bit wide data path. The user can indicate the desired operating data width. Based on determinations of slot size, desired operating width and the presence of other 8 or 16 bit devices, the operating data path width is automatically set. Warnings are given for selected operating conditions.

28 Claims, 6 Drawing Sheets

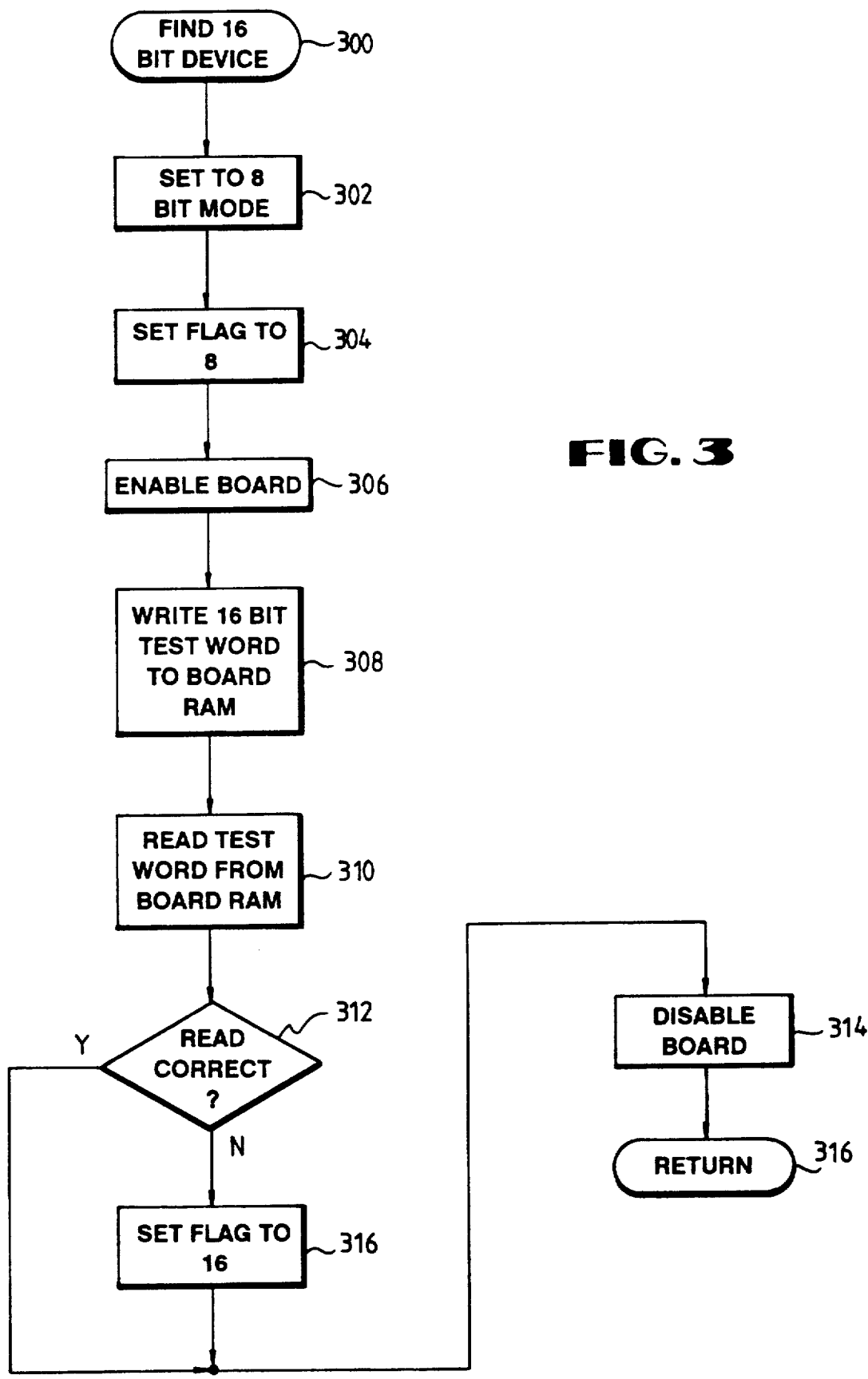

1

METHOD AND APPARATUS FOR DETERMINING THE ALLOWABLE DATA PATH WIDTH OF A DEVICE IN A COMPUTER SYSTEM TO AVOID INTERFERENCE WITH OTHER DEVICES

BACKGROUND OF THE INVENTION

1. Field of the Invention

The invention relates to circuit boards used in computer systems, and more particularly to circuit boards which can utilize two widths of data and methods for determining the allowable data width which can be passed by the circuit board.

2. Description of the Prior Art

Personal computers are becoming more widely used and more powerful at an increasingly fast rate. Original personal computer designs were based on an 8 bit microprocessor and had very limited amounts of memory and data storage capabilities. While these units were quite adequate, and considered advanced, for their time, the rush of technology soon provided more capable equipment and devices. Some of these more capable devices were incorporated by International Business Machines Corporation into the IBM PC. The IBM PC utilized the Intel Corporation 8088 microprocessor, which operated with a 16 bit word internally and transferred information over an 8 bit external data bus. Mass storage devices utilized in the original IBM PC usually consisted of floppy disk units capable of holding hundreds of kilobytes of data. Technology proceeded to advance and hard disk units capable of holding megabytes of data were soon available. IBM integrated these hard disk units into the PC and introduced a new model called the PC/XT. However, the PC/XT still utilized the Intel 8088 microprocessor and its 8 bit data path.

Device costs continued to fall and performance continued to increase. Further, applications programs became significantly more sophisticated and approached the limits of the IBM PC design. Additionally, Intel introduced the 80286 microprocessor, which had greatly expanded capabilities, including additional memory addressing and higher clock rates. This microprocessor was utilized by IBM in the IBM AT. This unit and units compatible with it satisfied the demand for personal computing power for a period of time, but again the electronics and computer industries proceeded to advance and introduce more powerful components. Applications programs became even larger and more complicated and thereby needed the greater power which was available.

Intel introduced the 80386 microprocessor, which utilized a 32 bit data word and a 32 bit data path to allow extreme performance improvement. A number of manufacturers developed personal computers utilizing this microprocessor, but in general these computers utilized the existing bus structure and characteristics of the IBM AT for use with interchangeable circuit boards. The use of interchangeable circuit boards had been developed to allow simple and easy changes and customization in the functionality of a given personal computer system. The bussing structure had originally been based on an 8 bit bus as developed in the IBM PC, but this was extended to include portions having a 16 bit data path as used in the IBM AT.

As higher performance circuit boards developed, it was considered desirable to be able to utilize the 16 bit data path provided in the IBM AT and compatible machines to obtain maximum performance. However, it was also considered preferable to be able to operate on the 8 bit bus or data path of the IBM PC. Therefore, circuit boards were developed which could operate using either the 8 or 16 bit data paths and associated interface protocols, but selection of the data path width could only be accomplished by means of properly setting switches or jumpers.

This jumper setup could be dramatically complicated if the circuit board was designed to operate in the memory address space which included the peripheral device memory segment or option memory, as defined by the operating system developed by Microsoft Corporation for the IBM PC and compatible units. A block of 128 kbytes is available for the option memory, generally read only memories (ROM's). The block size in the option memory area is 2 kbytes, so that up to 64 devices or options can use the area. As defined by the architecture of the IBM AT, the minimum address block size that can be readily interpreted by a 16 bit device is 128 kbytes, which is the entire option memory area. When a 16 bit device responds to a memory request a signal is lowered to indicate the size of data word. The response signal, referred to as M16-, must be issued before certain lower address lines are available for a smaller memory size block decoding to be performed. The M16- signal causes the bus controller to utilize the 16 bit data paths and only do one operation if 16 bits of data are being transferred. If an 8 bit device actually responds because of address decode problems, erroneous data is received because the upper 8 bits of the data bus are not driven. Thus it is critical that there not be a conflict between data widths of devices operating within a 128 kbyte memory block.

Because it is expected that a great number of different devices will be operating in the 128 kbyte option area, properly adjusting a circuit board having the 8 or 16 bit capability to be used in this area is dramatically complicated. To properly set the switches or jumpers on the board the user must first determine the data path operating widths of all of the boards operating in the 128 kbyte memory block in which the dual width circuit board will be operating. This may not overly difficult for an extremely skilled system integrator, but it is an extremely difficult or impossible task for a relatively unskilled user, who are becoming much more prevalent as the price of personal computers drops and their use expands. Thus, the task of properly setting the data width on the circuit board has become very complicated and is often resolved merely by trial and error. This does not necessary result in an optimal solution wherein the board runs at the optimum rate or maximum rate possible and may take a great deal of time.

SUMMARY OF THE INVENTION

An apparatus according to the present invention utilizes a circuit board which is controllable by the computer system to operate in an 8 or 16 bit data path mode. Additionally, the circuit board can determine whether it is located in a slot location which has only an 8 bit data path available or whether it is installed in a slot which allows 16 bit data path operation. For improved flexibility the user can also indicate a desired operating width.

The apparatus first determines whether it is located in an 8 bit slot. After this determination, an analysis is made to determine if the user has indicated a desired operating data width. Following this, the apparatus determines whether any 16 bit devices are operating in the 128 kbyte memory space. If there are no 16 bit devices operating in the 128 kbyte memory area, the apparatus determines whether an 8 bit device is operating in the same 128 kbyte address space. Based on the various determinations, the apparatus then performs a table lookup function to determine the proper operating mode and appropriately sets the circuit board to operate in this mode.

Error messages or warning conditions as appropriate are also indicated based upon various combinations of the various determinations. These warnings allow the user to place the circuit board in a 16 bit slot if another 16 bit device is present, to optimize the performance of the unit. Alternately, the messages indicate that a conflict is present either between devices present in the computer system or in the desired data width to allow the user to remedy the situation.

The presence of 16 bit devices is determined by setting the circuit board into the 8 bit mode and enabling the circuit board. The circuit board preferably contains on-board random access memory (RAM). A 16 bit test word is then written to and read from this on-board RAM. If the data is obtained correctly there are no 16 bit devices in the computer, for reasons discussed in the background.

Eight bit devices are determined by scanning the 128 kbyte address space for the presence of RAM or ROM. If none are found over the scan, then there are determined to be no 8 bit devices presently active. RAM is determined by writing to and reading from given locations using a word of data. If the read data is correct then RAM is present at that location. ROM's are determined by looking at the starting address of each block for a preset value with the circuit board first turned off and then turned on, the circuit board being in 16 bit mode. If the preset word value is found when the circuit board is turned off and is not obtained when the circuit board is turned on, then an 8 bit ROM is assumed to be present at that location.

Thus, the apparatus can readily determine whether it can physically perform a 16 bit wide data path operation, what the desired operating width is and whether any devices are present which force it to operate in a given mode. This is all performed without the user touching or setting any switches or jumpers and thus improves the ease of board setup and installation.

BRIEF DESCRIPTION OF THE DRAWINGS

A better understanding of the invention can be obtained when the following detailed description of the preferred embodiment is considered in conjunction with the following drawings, in which:

FIG. 3 is a flowchart illustration of the operating sequence of a computer system according to the present invention to determine if a 16 bit device is present.

DETAILED DESCRIPTION OF THE PREFERRED EMBODIMENT

The apparatus of the present invention is intended for use in personal computer systems compatible with the IBM PC or the IBM AT. An understanding of the various architectures and interface signals for these computer systems are assumed. More detail than given in this specification is available in the IBM Personal Computer AT Technical Reference Manual, pages 1-24 to 1-38, bearing a 1985 copyright date.

Figure 1:
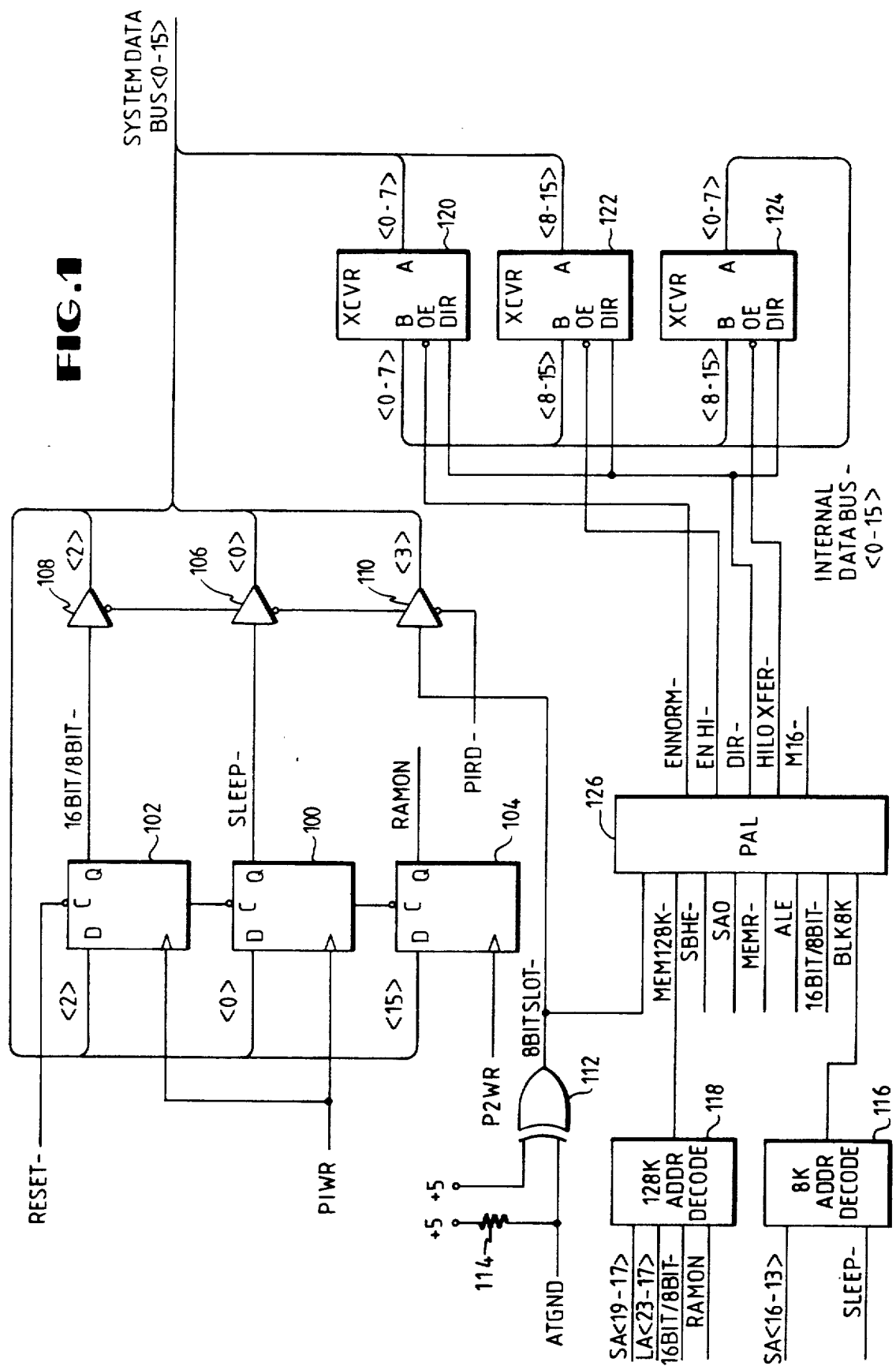
FIG. 1 is a schematic diagram of portions of the hardware of a computer system incorporating the present invention.

A circuit board containing the hardware components utilized in the present invention is installed in a personal computer using the IBM PC or IBM AT bus architectures. The system microprocessor (not shown) can set certain control bits in the hardware of the present invention or can read certain configuration and status information from the hardware. One of the control bits provided represents the SLEEP- signal. This signal is the output of a D-type flip-flop 100 (FIG. 1). The SLEEP-signal is used to indicate that the circuit board should be inactive when the signal is at a low or zero level. A second control bit is the 16BIT/8BIT- signal, which is developed as the output of a D-type flip-flop 102. The 16BIT/8BIT- signal when high is used to indicate that the circuit board is to operate in 16 bit mode, while when low is used to indicate 8 bit mode operation. The components on the circuit board generally operate in 16 bit mode internally to the circuit board. Flip-flops 100 and 102 have their D inputs connected to the appropriate lines of the system data bus, or buffers connected thereto, and are clocked by a signal referred to as P1WR, which is an encoded signal which has a rising edge when the input/output (I/O) port location assigned to the register or flip-flop is properly present and valid on the system address bus. A third control bit or signal utilized by the system microprocessor is the RAMON signal, which is provided by the output of a D-type flip-flop 104. The RAMON signal is used to activate certain static RAM contained on the circuit board embodying the present invention, which has a certain amount of memory which is utilized by other functions on the circuit board and is accessible by the system microprocessor. The D input of the flip-flop 104 is also coupled to the system data bus and the flip-flop 104 is clocked by P2WR signal, which has similar requirements and definitions as the P1WR signal, but is for a different I/O port location.

Three signals of interest are also provided to the system microprocessor from a circuit board according to the present invention. The SLEEP- signal and the 16BIT/8BIT- signal are provided to the system data bus by means of buffers 106 and 108 and a third signal, referred to as the 8 BITSLOT- signal, is provided by buffer 110. The 8 BITSLOT- signal is used to indicate whether the circuit board is placed in an 8 bit slot or 16 bit slot. The 8 BITSLOT- signal is provided by the output of an XOR gate 112. One input of the XOR gate 112 is connected to +5 volts, while the other input is pulled up to +5 volts by a resistor 114. That input, the second input to the XOR gate 112, is also connected to a line which is grounded if the circuit board is placed in a 16 bit slot, this line referred to as ATGND in FIG. 1. If the circuit board is not placed in a 16 bit slot, but is instead placed in an 8 bit slot, no connection is made to the ground and therefore both inputs to the XOR gate 112 are high, resulting in low output, which indicates that the circuit board is in an 8 bit slot. The enabling control for the buffers 106, 108 and 110 is provided by the P1RD-signal, which when low indicates that a read request has been issued to the I/O port designated as P1. Thus, the system microprocessor can determine the status of the SLEEP- and 16BIT/8BIT- signals and determine the size of the slot in which the circuit board is located.

Two types of address decoders are utilized in the preferred embodiment of the present invention. The first type of address decode determines when a given 8 kbyte block is being requested and is performed by the 8k address decode circuitry 116. The 8k address decode circuitry 116 includes the allowable addresses in the 8 kbyte block where the circuit board can be located and receives as inputs the SA<16−13> signals, which are provided from the system bus, and the SLEEP- signal. When the SLEEP- signal is low, the output signal of the 8k address decode circuitry 116, referred to as BLK8K, is low, indicating that an address decode has not been found, this feature allowing the disabling of the memory mapped areas of the circuit board to be completely disabled when the circuit board is not enabled. If the SLEEP- signal is high and the values appearing on the SA<16−13> signals are appropriate, the BLK8K signal goes high, indicating an 8 kbyte address match within the 128 kbyte block being decoded by the 8k address decode circuitry 116.

The second address decode is the 128 kbyte address decode, which is performed by the 128k address decode circuitry 118. The 128k address decode circuitry 118 has an output of the MEM128K- signal, which, when low, indicates that a match has been found at the proper 128 kbyte address block, the 8k address decode circuitry 116 performing the lower level address decoding. The 128k address decode circuitry 118 has inputs of the SA<19−17> signals, the LA<23−17> signals, the 16BIT/8BIT- signal, and the RAMON signal. The RAMON signal is used to disable address comparison by the 128k address decode circuitry 118 so that if the RAMON signal is low, the MEM128K-signal is always high, thus also indicating that an address match has not been found. The 16BIT/8BIT- signal is used to select between the SA and LA lines for address comparison purposes. The SA lines are used when the device is in 8 bit mode, the upper 4 bits representing what would be address signal 23-20 being assumed to be 0, an address match then being made with the other three signals. These signals are used because these are the appropriate signals to be used for 8 bit operation according to the architectures of the IBM PC and IBM AT. The LA signals are used for 16 bit operation because this allows the M16- signal to be low at the necessary time if an address match is found, the LA signals by definition having an earlier timing appearance according to the IBM AT architecture.

Data is transferred between the internal data bus and the system data bus by means of three transceivers 120, 122 and 124. The low byte transceiver 120 is connected between bits 0 to 7 of the internal and system data buses, while the high byte transceiver 122 is connected between bits 8 to 15 of the internal and system data buses. The transfer transceiver 124 is used to shift data from bits 0 to 7 of the internal data bus to bits 8 to 15 of the internal data bus, thus performing a high byte to low byte transfer.

Proper control of the transceivers 120, 122 and 124 allows information to be passed between the system data bus and the internal data bus based on whether the circuit board is operating in 8 or 16 bit mode, which particular bytes are requested by the system and the direction of the transfer. The control signals for the transceivers 120, 122 and 124 are provided by a programmable array logic (PAL) device 126. While a PAL is used for reduction in the number of components used, other logic which performs similar functions could be used. The PAL 126 has a number of inputs used to allow it to perform its function. These inputs include the 8BITSLOT- signal, the 16BIT/8BIT-signal, the BLK8K signal and the MEM128K- signal. In addition, a series of signals are provided from the system bus such as, the SBHE- signal, the SA0 signal, the MEMR-signal and the ALE signal. The SBHE- signal is used to indicate a high byte request when operating in 16 bit mode, the SA0 signal is the low bit of the address bus and is utilized during 8 bit operations, the MEMR- signal represents that a memory read operation is being requested by the system and the ALE signal is utilized to indicate when addressing information is valid on the system bus.

The PAL 126 has five output signals of interest. The first signal is the M16- signal, which is connected to the system bus to indicate that a 16 bit device will be responding to the requested memory operation. The other four signals are used to control the transceivers 120, 122 and 124. The four signals include the ENNORM- signal, the ENHI- signal, the HILOXFER- signal and the DIR- signal.

The MEM16- signal goes low only when the MEM128k-signal is low and the 16BIT/8BIT- signal is high, indicating that the circuit board is operating in 16 bit mode and that there is a 128 kbyte address match.

The DIR- signal controls the direction the transceivers 120, 122 and 124 are passing data and is low whenever the BLK8K signal is high, a latched version of the MEM128K- signal valid over the complete length of the memory cycle is low and the MEMR- signal is high, indicating an 128 kbyte address match and an 8 kbyte address match and that a read operation is not being performed. The latching operation is performed in the PAL 126 using the ALE signal and is necessary because the LA signals may not be present the entire length of the memory cycle. When the DIR- signal is low, data is transferred from the A ports of the transceivers 120, 122 and 124 to the B ports, the write direction, while when the DIR-signal is high, data is transferred from the B ports to the A ports, which would be appropriate when a read operation is occurring.

The ENNORM- signal, which is connected to the output enable of the low byte transceiver 120, is low whenever there is a 128 kbyte block address match and an 8 kbyte block address match as indicated by the BLK8K signal being high and the latched MEM128K-signal being low. This does not present a problem when the device is operating in 16 bit mode and only the high byte is requested because the low byte is ignored by the system. The ENHI- signal is connected to the output enable of the high byte transceiver 122 and is low or active whenever there is a 128 kbyte and an 8 kbyte block address match and data is not being transferred on the internal data bus from the high byte to the low byte. Thus, it may be activated at certain times such as when the device is in 16 bit mode and only the low byte is being requested or when the device is operating in 8 bit mode or is located in an 8 bit slot and the low byte is being requested. This is allowable operation because the values presented are either ignored by the system or are not connected to the system.

The HILOXFER- signal controls the output enable for the byte transfer transceiver 124 and is active whenever an odd byte address is presented and the circuit board is in an 8 bit slot or is operating in 8 bit mode. Determination of 8 bit mode is made by the PAL 126 by a determination that the circuit board is in a 16 bit slot and the M16- signal was not made active. The odd address determination when the circuit board is operating in 8 bit mode in a 16 bit slot is made by determining that the device is located in a 16 bit slot and that a high address has been requested as indicated by the SBHE- signal. The odd address determination when the circuit board is located in an 8 bit slot is based on the state of the SAO signal.

Thus the system microprocessor can determine what size slot the circuit board is located in and can direct the circuit board to operate in 16 bit or 8 bit wide data path mode as desired. These capabilities are utilized in the software portions of the invention in various manners as will be explained to allow determination of what other devices exist in the system and which may conflict with the operation of the circuit board in various modes.

Figure 2A:
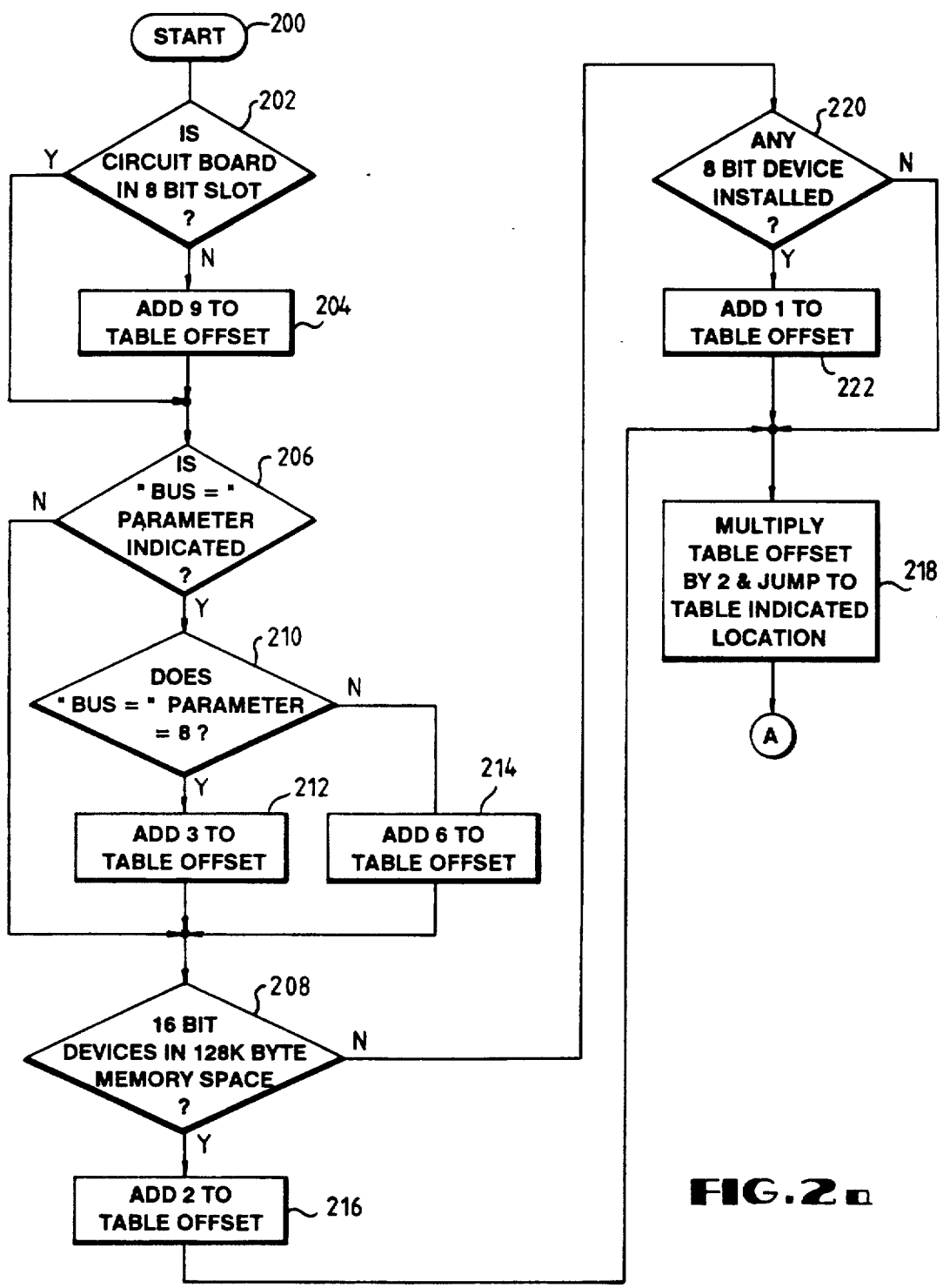
FIGS. 2A and 2B are flowchart illustrations of the operating sequence of a computer system, according to the present invention, to determine and set a data path operating width.

A computer program is utilized in the present invention in combination with the hardware as previously described and as shown in FIG. 1 to determine whether there are any other devices present in the computer system which would give an indication of the proper or desirable operating width. The computer program has a main module 200 (FIG. 2A). The operation of the main module 200 commences by determining in step 202 whether the circuit board is installed in an 8 bit slot by interrogating the status of the 8BITSLOT- signal. If the circuit board is not located in an 8 bit slot, control proceeds to step 204 where the value 9 is added to a previously zero value which determines a table offset to be used with a jump table. The main module 200 uses a jump table to allow efficient transfer to the proper operating sequence based on the results of various tests which are performed. If the circuit board is not located in an 8 bit slot, control transfers from step 202 to step 206, which is also where control transfers after completing the addition of step 204. At step 206 the system determines whether a BUS=parameter was indicated in the sequence which initiated operation of the main module 200. This parameter is commonly located in the command line presented to the operating system which causes execution of the main module 200, which request is ideally installed as a command in the CONFIG.SYS file utilized in a personal computer system utilizing the Microsoft Corporation MS-DOS operating system. If no BUS=parameter is indicated, control transfers to step 208.

If the BUS=parameter does exist, step 210 determines whether the parameter was an 8, indicating desirability of 8 bit operation. If so, control transfers to step 212 where a value of 3 is added to the table offset. If a value of 8 was not indicated, step 210 transfers control to step 214 where a value of 6 is added to the table offset. Control proceeds from step 212 or step 214 to step 208. In step 208, a determination is made as to whether any 16 bit devices are located in the 128 kbyte memory space which will be utilized by the circuit board. This is done by means of a separate sequence 300 which will be described later. If 16 bit devices are present, control transfers to step 216 where a value of 2 is added to the table offset. Control then transfers to step 218.

If no 16 bit devices were indicated in step 208 as being present, control transfers from step 208 to step 220, where a test is performed to determine if any 8 bit devices are installed in the computer system. This 8 bit test is done by a sequence 400 which will be described later. If an 8 bit device is not present, control transfers from step 220 to step 218. If an 8 bit device is present, control transfers to step 222 where a value of 1 is added to the table offset. Control then transfers to step 218.

Figure 2B:
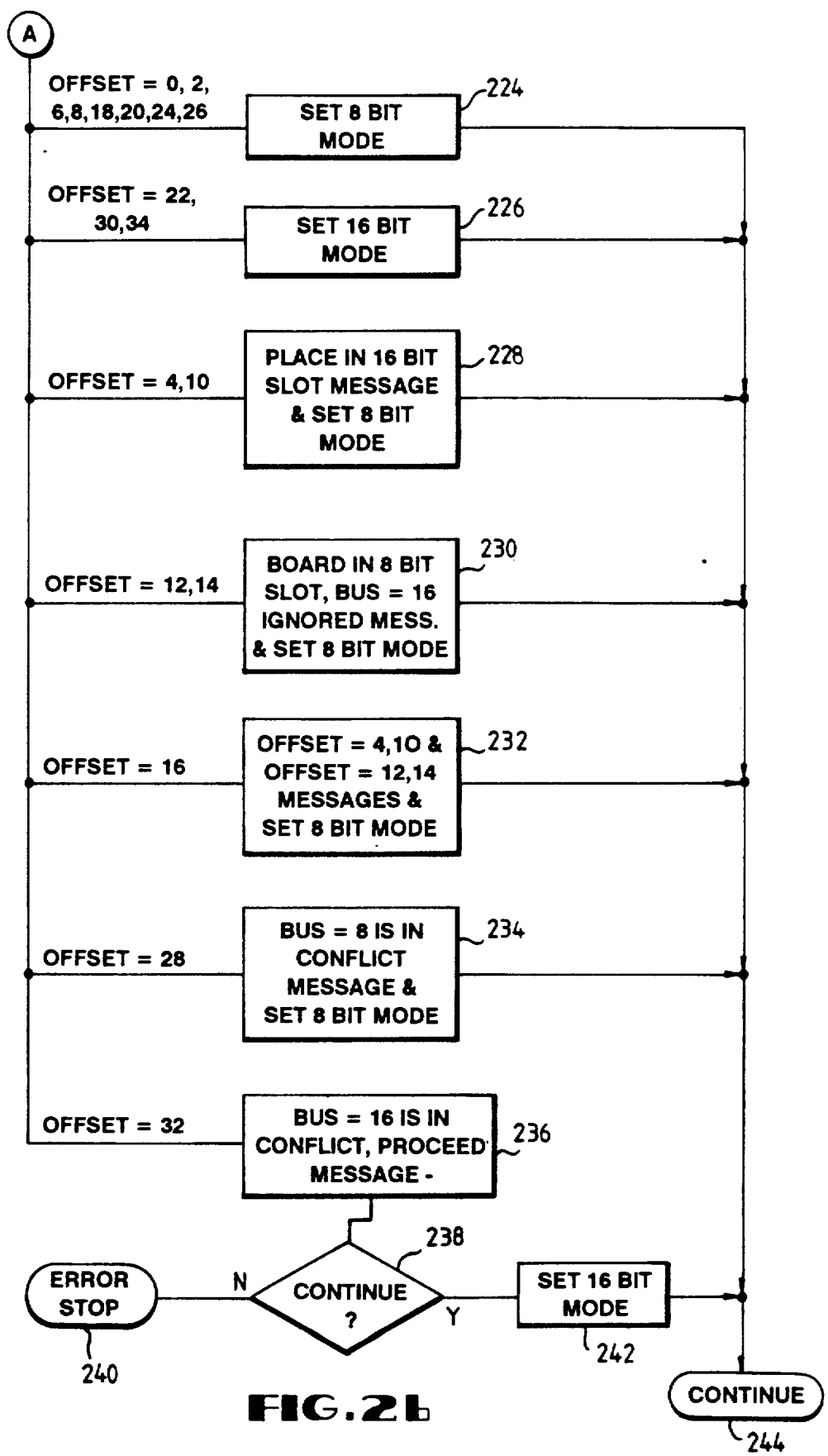

In step 218, the value which has been accumulating as the table offset is multiplied by 2, because in the preferred embodiment the addresses are in a 16 bit or word format. A table lookup is performed based on the table offset value and the relative address of the sequence appropriate to the operation width based on the determined characteristics is obtained. A jump instruction is then operated based on this address and the appropriate sequence operated. This jump operation is shown in FIG. 2B based on the offset value, which is indicated in the flowchart.

A summary of the conditions determined by the system performing the tests of steps 202, 206, 210, 208 and 220, with appropriate table offset values and the appropriate action is shown in the following Table 1.

TABLE 1

| Offset Value | Operation | Conditions | | |
|---|---|---|---|---|
| | | Slot Size | Bus = Value | Other Device Size |
| 0 | Normal Bus 8 | 8 | None | None |
| 2 | Normal Bus 8 | 8 | None | 8 |
| 4 | Warning 1 | 8 | None | 16 |
| 6 | Normal Bus 8 | 8 | 8 | None |
| 8 | Normal Bus 8 | 8 | 8 | 8 |
| 10 | Warning 1 | 8 | 8 | 16 |
| 12 | Warning 2 | 8 | 16 | None |
| 14 | Warning 2 | 8 | 16 | 8 |
| 16 | Warning 3 | 8 | 16 | 16 |
| 18 | Normal Bus 8 | 16 | None | None |
| 20 | Normal Bus 8 | 16 | None | 8 |
| 22 | Normal Bus 16 | 16 | None | 16 |
| 24 | Normal Bus 8 | 16 | 8 | None |
| 26 | Normal Bus 8 | 16 | 8 | 8 |
| 28 | Warning 4 | 16 | 8 | 16 |
| 30 | Normal Bus 16 | 16 | 16 | None |
| 32 | Warning 5 | 16 | 16 | 8 |
| 34 | Normal Bus 16 | 16 | 16 | 16 |

The first operating mode is set by a jump to step 224, where the circuit board is set top operate in 8 bit mode. This is performed for table offsets equal to 0, 2, 8, 18, 20, 24 and 26, which represent conditions where the desired size is either not specified or is requested to be 8 bit and 8 bit devices are present or no devices are found. The second jump location is to step 226, where the circuit board is set to 16 bit operation. Step 226 is performed for offset values of 22, 30 and 34, which represent situations where there is no potential conflict to be resolved or found between the devices present, the slot size and the desired size indication and 16 bit operation can be performed.

The third jump location is to step 228 and is performed for table offsets of 4 and 10. In step 228 the circuit board is set for 8 bit operation and a warning message is provided that the circuit board should be placed in a 16 bit slot to resolve potential conflicts. This message is given when the circuit board has been placed in an 8 bit slot, a 16 bit device has been found and a desired bus size has either not been indicated or has been specified to be 8 bits. Because a 16 bit device has been found to be in the same 128 kbyte memory area, there is a possibility that the device will not operate correctly in 8 bit mode because of the overlapping problem of utilizing a smaller memory area such as 2 kbyte inside the larger 128 kbyte address space which is specified and interpreted by the 16 bit device which is present in the address space. If configured for this operation the circuit board would only respond on an 8 bit bus, with the other 8 data bits being not driven, thus possibly resulting in erroneous operation.

The next possible jump location is to step 230, which is performed for table offset values of 12 and 14. In step 230, the circuit board is configured for 8 bit operation and a message is provided to the user to indicate that the board is located in an 8 bit slot and that the BUS=16 request has been ignored.

For a table offset value equal to 16, step 232 is performed, in which the circuit board is set for 8 bit mode of operation and the warning messages of steps 228 and steps 230 are presented. The table offset value of 16 corresponds to the case where the circuit board is installed in an 8 bit slot, 16 bit operation has been requested and 16 bit devices are present.

Step 234 is performed if the table offset value is equal 28, indicating that the circuit board is in a 16 bit slot and that 16 bit devices are present, but that it has been indicated that the operation width should be 8 bits. In step 234, the circuit board is set to 8 bit mode and an error message or warning message that the BUS=8 statement is in conflict with the slot size and devices present is sent to the user.

The final jump location is to step 236 which is performed for a table offset value of 32. This table offset value indicates that the circuit board is placed in a 16 bit slot and that 16 bit operation has been requested but that there are 8 bit devices present. If the circuit board were configured for 16 bit operation this could potentially interfere with the operations of the 8 bit devices because of the M16- signal being utilized in a 128 kbyte memory block, with 8 bit devices present in this block. In step 236, a warning message is provided that indicates that the BUS=16 statement used to indicate the desired operating width is in conflict with the data size of devices present in the system. The user is then requested in step 238 to indicate a desire to continue and set 16 bit mode as requested. If 16 bit mode is not to be used, control transfers to step 240 where an error message is given and operation stops. If 16 bit mode is desired to be entered, control proceeds to step 242, where the circuit board is is set to operate in 16 bit mode by setting the 16BIT/8BIT- control bit on the flip-flop 102. From step 242 and from all of the other steps to which jumps are made, control transfers to step 244 to continue operation of the system.

The FIND 16 BIT DEVICE sequence 300 (FIG. 3) commences at step 302 where the system sets the circuit board to operate in 8 bit mode. In step 304, a flag is set to indicate the value 8 to communicate default operation as 8 bits. In step 306, the circuit board is enabled by properly setting the SLEEP- and RAMON flip-flops 100 and 104. In step 308, a 16 bit test word is written to the RAM located on the circuit board. In step 310, the 16 bit test word is then read from the on-board RAM. In step 312 a determination is made as to whether the read value is the same as the value which was written to the memory location. If it is, this is an indication that the transfer was successfully performed in 8 bit mode and control transfers to step 314. If the value read is not correct, control transfers to step 316. The value would not be correct if a 16 bit device was operating in the same 128 kbyte memory space. The 16 bit device would have pulled the M16- signal low, thus indicating to the system that a 16 bit device would be responding over all 16 data lines. The circuit board would have only responded on 8 data lines being set to 8 bit mode, and therefore the top byte value would not be correct. In step 316, the flag is set to 16 to indicate to the calling procedure that a 16 bit device has been found. Control then proceeds to step 314 where operation of the board is disabled by clearing or properly resetting the SLEEP- and RAMON flip-flops 100 and 104. Control then proceeds to step 316 which is a return to the calling sequence.

Figure 4A:
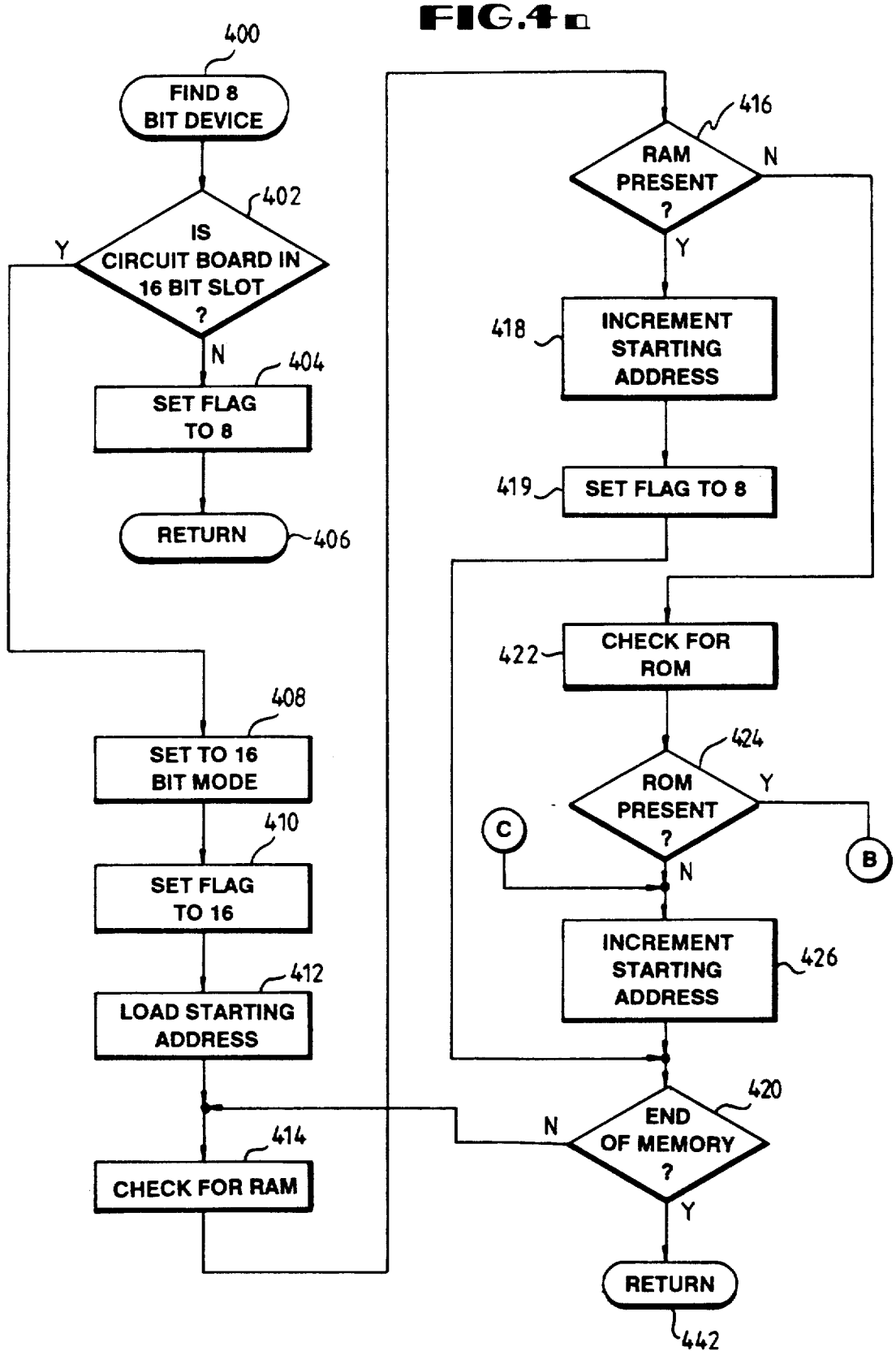
FIGS. 4A and 4B are flowchart illustrations of the operating sequence of a computer system according to the present invention to determine if an 8 bit device is present.

Determining the presence of an 8 bit device is slightly more complicated. The FIND 8 BIT DEVICE sequence 400 is commenced at step 402 (FIG. 4A). In step 402 the system determines whether the circuit board is installed in a 16 bit slot by reading the states of the 8BITSLOT-signal. If it is not, that is if it is installed in an 8 bit slot, control proceeds to step 404, where a flag is set to 8 to indicate that an 8 bit device has been found and then control proceeds to step 406 which causes a return to the calling sequence. This path is taken to speed operation because it is not possible to operate in 16 bit mode when installed in an 8 bit slot and thus the full test need not be performed. The setting of the operational mode and presentation of warning messages is not affected by this assumption even though certain table offset values may thus not occur, because the same mode and messages are set and given for the no device found and 8 bit device found cases when operating in an 8 bit slot.

If the circuit board is installed in a 16 bit slot, control proceeds from step 402 to step 408, where the board is placed into 16 bit mode of operation. Control then proceeds to step 410, where the flag is set to 16. Control next proceeds to step 412, where the starting address for the 128 kbyte memory block where the circuit board is located is loaded. In step 414, the presence of any RAM at the particular 2 bkyte memory block located at the starting address is determined. This check for RAM is generally performed by writing to and then reading back from a given memory location, preferably offset from the starting location to resolve possible conflict problems. Control then proceeds to step 416, where a determination is made as to whether any RAM was found. If so, control proceeds to step 418 where the starting address value is incremented by a given value, preferably 2 kbytes, which is the standard memory block size for memory blocks installed in the option memory area of computers compatible with the IBM PC. Control proceeds from step 418 to step 419 where the flag is set to 8 to indicate the presence of an 8 bit device. Control then proceeds to step 420.

If no RAM was found to be present in step 416, control proceeds from step 416 to step 422, where a check is made to see if any ROM is present. A ROM check is generally performed by reading the starting address word and checking to see if the value AA55 is present. This has become the standard convention for determining whether a ROM is present. Control then proceeds to step 424, where the system determines whether ROM was present. If no ROM was present, control proceeds to step 426 where the starting address is incremented. Control proceeds from step 426 to 420.

Figure 4B:
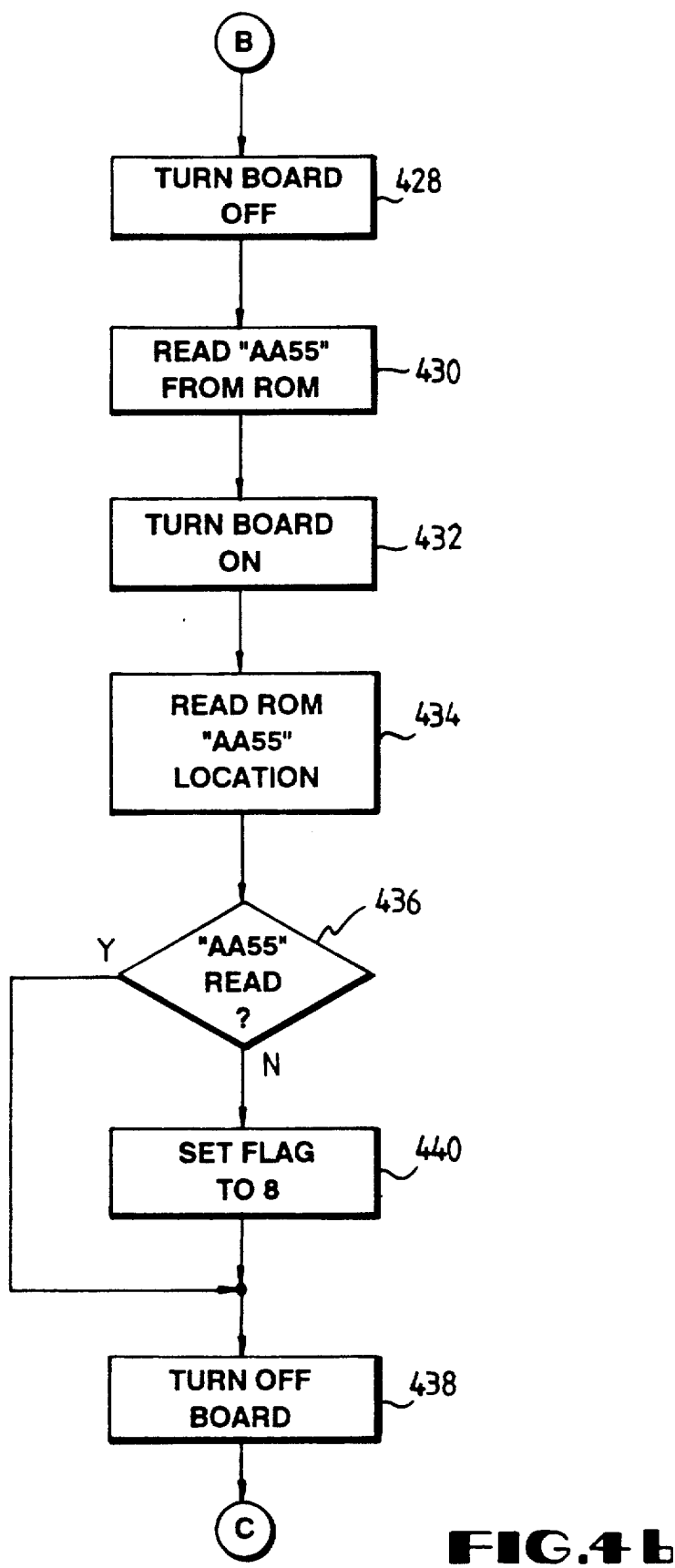

If ROM was present as determined in step 424, control proceeds to step 428 (FIG. 4B) where the board is turned off. The circuit board should have been turned off, but it is turned off again in step 428 to guarantee the circuit board state. A second reading of the AA55 value is performed in step 430 to verify that this is actually the value that is obtained. Control then proceeds to step 430 where the circuit board is turned on by properly setting the SLEEP- and RAMON flip-flops 100 and 104. The ROM is again read in step 434. In step 436, a determination is made as to whether the AA55 value was properly read in step 434. If so, this indicates that the board was able to function properly in 16 bit mode at this time. However, this does not mean that no 8 bit devices are present and that 16 bit operation is possible. Eight bit devices might be present but they might be inactive at this time and therefore this is considered to be an unsure condition or unknown condition. If the AA55 was read correctly, control proceeds to step 438.

If the AA55 value was not properly read as determined in step 436, control proceeds to step 440 where the flag is set to 8 to indicate an 8 bit device is present. If an 8 bit device were present and it were an 8 bit ROM it would not properly respond in 16 bit mode operation because it would not have supplied a data value to the upper 8 bits or upper byte. Therefore, AA55 would not have been received and it is thus determined that an 8 bit device must be present. Control transfers from step 440 to step 438, where the circuit board is turned off. Control then proceeds from step 438 to step 426 where the memory starting address is incremented. Control proceeds from step 426 to step 420 where a determination is made as to whether this is the end of the memory block under test. If not, control proceeds to step 414 and the cycle repeats. If this is the end of the memory block, control proceeds to step 442, which causes a return to the calling routine.

Thus, the present invention allows automatic determination and setting of the operating data width of a circuit board without requiring a user to know the operating widths of all the circuit boards present in a given memory block and without having to set switches or jumpers.

The foregoing disclosure and description of the invention are illustrative and explanatory thereof, and various changes in the size, shape, materials, components, circuit elements, wiring connections and contacts, as well as in the details of the illustrated circuitry, construction and operation may be made without departing from the spirit of the invention.

We claim:

1. An apparatus for setting the operating data path width of a unit which can operate in a predetermined portion of an address space on either of a first data path width or a second, wider data path width, responds based on a decode of a first series of address lines when operating on the first data path width and responds based on a decode of a second series of address lines when operating on the second data path width, the second series of address lines have a minimum portion decode size of the size of the predetermined portion of the address space in which the unit operates, and the first series of address lines having a minimum decode size of the first data path width, the unit connected to a computer system at a particular location, the computer system having a first data path of the first data path width and a second data path having a width equal to the second data path width less the first data path width, the second data path combining with the first data path to allow use of the second data path width, having one ground connection associated with the second data path to allow determination of the presence of the second data path at each connection location and having locations for connection of a plurality of devices operating in the predetermined portion of the address space, the plurality of devices including units operating on the first data path width and units operating on the second data path width, the apparatus comprising:

means for operating the unit at the first data path width when a bit is set to a first state and at the second data path width when said bit is set to a second state;

means for determining if only the first data path width is available to the unit by monitoring the presence of said one ground connection associated with said second data path; and means coupled to said means for operating the unit and said means for determining if only the first data path width is available and responsive to said means for determining if only the first data path width is available determining the availability of only the first data path width for setting said bit of said means for operating the unit to said first state.

2. The apparatus of claim 1, further comprising:

means for determining if devices operating on the second data path width are present in the predetermined portion of the address space; and means coupled to said means for operating the unit, said means for determining if only the first data path width is available and said means for determining if devices on the second data path width are present and responsive to said means for determining if only the first data path width is available determining the availability of the second data path width and responsive to said means for determining if devices on the second data path width are present determining the presence of second data path width operating devices for setting said bit of said means for operating the unit to said second state.

3. The apparatus of claim 2, further comprising:

means for determining if devices operating on the first data path width are present in the predetermined portion of the address space; and means coupled to said means for operating the unit, said means for determining if only the first data path width is available, said means for determining if devices operating on the first data path width are present and said means for determining if devices operating on the second data path width are present and responsive to said means for determining if only the first data path width is available determining the availability of the second data path width, responsive to said means for determining if devices on the second data path width are present determining the lack of devices and responsive to said means for determining if devices operating on the first data path width are present determining the presence of devices for setting said bit of said means for operating the unit to said first state.

4. The apparatus of claim 3, further comprising:

means said means for determining if only the first data path width is available and said means for determining if devices on the second data path width are present and responsive to said means for determining if only the first data path width is available determining the availability of only the first data path width and responsive to said means for determining if devices on the second data path width are present determining the presence of devices for providing a warning indication to the operator of the computer system.

5. The apparatus of claim 3, further comprising:
means coupled to said means for operating the unit, said means for determining if devices operating on the first data path width are present and said means for determining if devices on the second data path width are present and responsive to said means for determining if devices operating on the first data path width are present determining the lack of devices and responsive to said means for determining if devices on the second data path width are available determining the lack of devices for setting said bit of said means for operating the unit to said first state.

6. The apparatus of claim 3, wherein said means for determining if devices operating on the first data path width are present includes:
means coupled to said means for operating the unit for setting said bit of said means for operating the unit to said second state;
means for writing a value to each of a series of locations in the predetermined portion of the address space;
means for reading a value from each of said series of locations in the predetermined portion of the address space after writing to each of said series of locations in the predetermined portion of the address space;
means coupled to said means for writing a value and to said means for reading a value for determining if the read value is equal to the written value and determining that a device operating on the first data path width is present if equal;
means coupled to said means for determining if the read value is equal to the written value for reading a value at each of said series of locations and determining if said second read value is equal to a predetermined value for each of said series of locations in the predetermined address space where said means for determining if the read value is equal to the written value does not determine that a device operating on the first data width is present;
means coupled to said means for determining if the second read value is equal to the predetermined value for reading a second data path width value rom each of said series of locations in the predetermined address space where said means for determining if the read value is equal to the predetermined value determines the values are equal; and
means coupled to said means for reading a second data path width value from each of said series of locations for determining if said read second path width value is equal to a predetermined value and determining that a device operating on the first data path width is present if not equal.

7. The apparatus of claim 2 further comprising:
means for indicating a desired operating data path width of the unit.

8. The apparatus of claim 7, further comprising:
means coupled to said means for operating the unit, said means for indicating a desired operating data path width and said means for setting said bit of said means for operating the unit to said second state and responsive to said means for indicating a desired operating data path width indicating operation on the first data path width for setting said bit of said means for operating the unit to said first state and for overriding said means for setting said bit of said means for operating the unit to said second state.

9. The apparatus of claim 8, further comprising:
means for determining if devices operating on the second data path width are present in the predetermined portion of the address space; and
means coupled to said means for indicating a desired operating data path width, said means for determining if devices operating on the second data path width are present and said means for means for determining if only the first data path width is available and responsive to said means for determining if only the first data path width is available determining the availability of the second data path width, responsive to said means for determining if devices operating on the second data path width are present determining the presence of devices and responsive to said means for indicating a desired operating path width indicating operation on the first data path width for providing a warning indication to the operator of the computer system.

10. The apparatus of claim 9, wherein the unit includes means for storing and providing data and wherein said means for determining if devices operating on the second data path width are present includes:
means coupled to said means for operating the unit for setting said bit of said means for operating the unit to said first state;
means for writing a value of the second data path width to the unit after said bit of said means for operating the unit is set to said first state;
means for performing a read operation of the second data path width from the unit after said value of the second data width is written to the unit; and
means coupled to said means for performing a read operation of the second data path width and said means for writing a value of the second data path width to the unit for comparing the value obtained from the read operation and the value written to the unit and determining that a device operating on the second data path width is present if the values are not equal.

11. The apparatus of claim 7, further comprising:
means coupled to said means for indicating a desired operating data path width and said means for means determining if only the first data path width is available and responsive to said means for indicating a desired data width indicating second width operation and responsive to said means for determining if only the first data path width is available indicating the availability of only the first data path width for providing a warning indication to the operator of the computer system.

12. The apparatus of claim 7, further comprising:
means coupled to said means for indicating a desired operating data path width, said means for operating the unit and said means for determining if only the first data path width is available and responsive to said means for indicating a desired data path width indicating the second data path width and responsive to said means for determining if only the first data path width is available indicating the availability of the second data path for setting said bit of said means for operating the unit to said second state.

13. The apparatus of claim 12, further comprising:
means for determining if devices operating on the first data path width are present in the predetermined portion of the address space; and
means coupled to said means for indicating a desired operating data path width, said means for determining if devices operating on the first data path width are present in the second address space and said means for means for determining if only the first data path width is available and responsive to said means for indicating a desired operating data path width means indicating the second data path width, responsive to said means for determining if only the first data path width is available determining the availability of the second data path width and responsive to said means for determining if devices operating on the first data path width are present determining the presence of devices for providing a warning message to the operator of the computer system.

14. The apparatus of claim 2, wherein the unit includes means for storing and providing data and wherein said means for determining if devices operating on the second data path width are present includes:
means coupled to said means for operating the unit for setting said bit of said means for operating the unit to said first state;
means for writing a value of the second data path width to the unit after said bit of said means for operating the unit is set to said first state;
means for performing a read operation of the second data path width from the unit after said value of the second data width is written to the unit; and
means coupled to said means for performing a read operation of the second data path width and said means for writing a value of the second data path width to the unit for comparing the value obtained from the read operation and the value written to the unit and determining that a device operating on the second data path width is present if the values are not equal.

15. A machine implemented method for setting the operating data path width of a unit which can operate in a predetermined portion of an address space on either of a first data path width or a second, wider data path width , responds based on a decode of a first series of address lines when operating on the first data path width and responds based on a decode of a second series of larger address lines when operating on the second data path width, the second series of address liens having a minimum portion decode size of the size of the predetermined portion of the address space in which the unit operates, the first series of address lines having a minimum decode size of the first data path width and having a means for operating the unit at the first data path width when a bit is set to a first state and at the second data path width when said bit is set to a second state, the unit connected to a computer system at a particular location computer system having a first data path of the first, narrow data path width and a second data path having a width equal to the second, wider data path width less the first data path width, the second data path combining with the first data path to allow use of the second data path width, having one ground connection associated with the second data path to allow determination of the presence of the second data path at each connection location and having locations for connection of a plurality of devices operating in the predetermined portion of the address space, the plurality of devices including units operating on the first data path width and units operating on the second data path width, the machine implemented method comprising:
determining if only the first data path width is available to the unit by monitoring the presence of said one ground connection associated with said second data path; and
setting said bit of the means for operating the unit to said first state responsive to determining the availability of only the first data path width.

16. The machine implemented method of claim 15, further comprising:
determining if devices operating on the second data path width are present in the predetermined portion of the address space; and
setting said bit of the means for operating the unit to said second state responsive to determining the availability of the second data path width and responsive to determining the presence of second data path width operating devices.

17. The machine implemented method of claim 13, further comprising:
determining if devices operating on the first data path width are present in the predetermined portion of the address space; and
setting said bit of the means for operating the unit to said first state responsive to determining the availability of the second data path width, responsive to determining the lack of second data path width devices and responsive to determining the presence of first data path width devices.

18. The machine implemented method of claim 17, further comprising:
providing a warning indication to the operator of the computer system responsive to determining the availability of only the first data path width and responsive to determining the presence of second data path width devices.

19. The machine implemented method of claim 14, further comprising:
setting said bit of the means for operating the unit to said first state responsive to determining the lack of first data path width devices and responsive to determining the lack of second data width path devices.

20. The machine implemented method of claim 14, wherein said step of determining if devices operating on the first data path width are present includes:
setting said bit of the means for operating the unit to said second state;
writing a value to each of a series of locations in the predetermined portion of the address space;
reading a first value from each of said series of locations in the predetermined portion of the address space after writing to each of said series of locations in the predetermined portion of the address space;
determining if the first read value is equal to the written value and determining that a device operating on the first data path width is present if equal;
reading a second value from each of said series of locations and determining if said second read value is equal to a predetermined value for each of said series of locations in the predetermined address space after determining that the first read value and the written value are not equal;

reading a second data path width value from each of said series of locations in the predetermined address space where the read value and the predetermined value and equal; and determining if said read second data path width value is equal to a predetermined value and determining that a device operating on the first data path width is present if not equal.

21. The machine implemented method of claim 13, wherein the unit includes means for storing and providing data and wherein said step of determining if devices operating on the second data path width are present includes:

setting said bit of the means for operating the unit to said first state;

writing a value of the second data path width to the unit after said bit of the means for operating the unit is set to said first state;

performing a read operation of the second data path width from the unit after said value of the second data width is written to the unit; and comparing the value obtained from the read operation and the value written to the unit and determining that a device operating on the second data path width is present if the values are not equal.

22. The machine implemented method of claim 16 further comprising:

indicating a desired operating data path width of the unit.

23. The machine implemented method of claim 17 further comprising:

setting said bit of the means for operating the unit to said first state and overriding setting said operating means bit to said second state responsive to indicating operation on the first data path width.

24. The machine implemented method of claim 23, further comprising:

determining if devices operating on the second data path width are present in the predetermined portion of the address space; and providing a warning indication to the operator of the computer system responsive to determining the availability of the second data path width, responsive to determining the presence of second data path width devices and responsive to indicating operation on the first data path width.

25. The machine implemented method of claim 24, wherein the unit includes means for storing and providing data and wherein said step of determining if devices operating on the second data path width are present includes:

setting said bit of the means for operating the unit to said first state;

writing a value of the second data path width to the unit after said bit of the means for operating the unit is set to said first state;

performing a read operation of the second data path width from the unit after said value of the second data width is written to the unit; and comparing the value obtained from the read operation and the value written to the unit and determining that a device operating on the second data path width is present if the values are not equal.

26. The machine implemented method of claim 17, further comprising:

providing a warning indication to the operator of the computer system responsive to indicating second width operation and responsive to determining the availability of only the first data path width.

27. The machine implemented method of claim 22, further comprising:

setting said bit of the means for operating the unit to said second state responsive to indicating the second data path width and responsive to determining the availability of the second data path.

28. The machine implemented method of claim 27, further comprising:

determining if devices operating on the first data path width are present in the predetermined portion of the address space; and providing a warning message to the operator of the computer system responsive to indicating the second data path width, responsive to determining the availability of the second data path width and responsive to determining the presence of second data path width devices.

* * * * *

UNITED STATES PATENT AND TRADEMARK OFFICE
CERTIFICATE OF CORRECTION

PATENT NO. : 5,168,562
DATED : December 1, 1992
INVENTOR(S) : Craig A. Estepp and David M. Burckhartt It is certified that error appears in the above-identified patent and that said Letters Patent is hereby corrected as shown below:

In column 13, line 52, delete "rom" and insert therefor -- from --.

In column 14, line 52, after "for means" insert -- for --.

In column 15, line 53, delete "liens" and insert therefor -- lines --.

In column 15, line 62, after "location" insert -- , the --.

In column 16, line 25, after "claim" delete "13" and insert therefor -- 16 --.

In column 16, line 43, after "claim" delete "14" and insert therefor -- 17 --.

In column 16, line 50, after "claim" delete "14" and insert therefor -- 17 --.

In column 17, line 11, after "claim" delete "13" and insert therefor -- 16 --.

In column 17, line 32, after "claim" delete "17" and insert therefor -- 22 --.

In column 18, line 21, after "claim" delete "17" and insert therefor -- 22 --.

Signed and Sealed this

Nineteenth Day of October, 1993

Attest:

BRUCE LEHMAN

Attesting Officer  Commissioner of Patents and Trademarks

UNITED STATES PATENT AND TRADEMARK OFFICE
CERTIFICATE OF CORRECTION

PATENT NO. : 5,168,562  
DATED : December 1, 1992  
INVENTOR(S) : Craig A. Estepp et al.

It is certified that error appears in the above-identified patent and that said Letters Patent is hereby corrected as shown below:

Column 13,  
Line 58, between "second" and "path" insert -- data --.

Column 15,  
Line 24, delete "claim 2" and insert -- claim 9 --.  
Line 49, delete "width ," and insert -- width, --.  
Line 63, delete "narrow" and insert -- narrower --.

Column 17,  
Line 6, between "value" and "equal" delete "and" and insert -- are --.

Signed and Sealed this

Seventh Day of February, 2006

JON W. DUDAS  
*Director of the United States Patent and Trademark Office*